United States Patent
Bang et al.

(10) Patent No.: US 12,217,041 B2
(45) Date of Patent: Feb. 4, 2025

(54) PORTABLE DEVICE COMMUNICATING WITH CHARGER AND OPERATING METHOD THEREOF

(71) Applicant: SAMSUNG ELECTRONICS CO., LTD., Suwon-si (KR)

(72) Inventors: Sangun Bang, Seongnam-si (KR); Dongjo Kim, Suwon-si (KR); Jaehyun Bae, Suwon-si (KR); Junhan Bae, Seoul (KR); Duseung Oh, Hwaseong-si (KR); Sungeun Lee, Hwaseong-si (KR); Arom Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 133 days.

(21) Appl. No.: 17/573,849

(22) Filed: Jan. 12, 2022

(65) Prior Publication Data
US 2022/0222063 A1    Jul. 14, 2022

(30) Foreign Application Priority Data

Jan. 13, 2021    (KR) .................. 10-2021-0004936
May 17, 2021    (KR) .................. 10-2021-0063619

(51) Int. Cl.
*G06F 8/65* (2018.01)
*H04B 3/54* (2006.01)
*H04L 1/00* (2006.01)

(52) U.S. Cl.
CPC .............. *G06F 8/65* (2013.01); *H04B 3/54* (2013.01); *H04L 1/0061* (2013.01)

(58) Field of Classification Search
None
See application file for complete search history.

(56) References Cited

U.S. PATENT DOCUMENTS

| | | | |
|---|---|---|---|
| 8,344,874 B2 | 1/2013 | Fadell | |
| 8,826,265 B2 * | 9/2014 | Vedantham | H04B 3/542 |
| | | | 717/172 |
| 9,590,698 B1 * | 3/2017 | Duff | G06F 8/65 |
| 9,935,686 B2 | 4/2018 | Yoon | |
| 10,142,750 B2 | 11/2018 | Hariharan et al. | |

(Continued)

FOREIGN PATENT DOCUMENTS

| | | | |
|---|---|---|---|
| JP | 2017-21566 A | | 1/2017 |
| JP | 2017211878 A | * | 11/2017 |

(Continued)

OTHER PUBLICATIONS

Mlynek, "Simulation of Achievable Data Rates of Broadband Power Line Communication for Smart Metering" 2019, Applied Sciences (Year: 2019).*

*Primary Examiner* — Hossain M Morshed
(74) *Attorney, Agent, or Firm* — Fish & Richardson P.C.

(57) ABSTRACT

A portable device and an operating method of the same are provided. The portable device includes a power line communication module performing power line communication with an external device, a memory module storing firmware data, and a controller controlling the power line communication module and the memory module, wherein the power line communication module sequentially provides an update initiation signal and firmware data to the external device, and provides an update end signal to the external device in response to a response signal transmitted by the external device.

20 Claims, 11 Drawing Sheets

(56) References Cited

U.S. PATENT DOCUMENTS

| | | | |
|---|---|---|---|
| 10,524,037 B2* | 12/2019 | Watson | H04L 67/51 |
| 11,567,748 B2* | 1/2023 | Jang | G06F 8/71 |
| 2009/0265736 A1* | 10/2009 | Son | H04N 21/25858 |
| | | | 725/132 |
| 2011/0173691 A1* | 7/2011 | Baba | H04L 9/3263 |
| | | | 726/10 |
| 2012/0060151 A1* | 3/2012 | Oh | H04L 41/082 |
| | | | 717/172 |
| 2013/0104117 A1* | 4/2013 | Vedantham | H04B 3/542 |
| | | | 717/172 |
| 2015/0007161 A1* | 1/2015 | Yagi | G06F 8/65 |
| | | | 717/171 |
| 2015/0365132 A1 | 12/2015 | Yu | |
| 2016/0011887 A1* | 1/2016 | Chung | G06F 8/654 |
| | | | 713/2 |
| 2016/0216957 A1* | 7/2016 | Yoon | G06F 8/654 |
| 2018/0024828 A1* | 1/2018 | Nogueira-Nine | H04L 67/34 |
| | | | 717/173 |
| 2018/0248414 A1* | 8/2018 | Liu | H04R 1/1025 |
| 2019/0258472 A1* | 8/2019 | Kim | H04W 4/80 |
| 2021/0397440 A1* | 12/2021 | Sayyed | G06F 1/3212 |

FOREIGN PATENT DOCUMENTS

| | | |
|---|---|---|
| KR | 10-1497934 B1 | 3/2015 |
| KR | 10-2018-0090131 A | 8/2018 |
| KR | 10-2071268 B1 | 1/2020 |
| KR | 10-2020-0080796 A | 7/2020 |

\* cited by examiner

PORTABLE DEVICE COMMUNICATING WITH CHARGER AND OPERATING METHOD THEREOF

CROSS-REFERENCE TO RELATED APPLICATIONS

This application is based on and claims priority under 35 U.S.C. § 119 to Korean Patent Application No. 10-2021-0004936, filed on Jan. 13, 2021, and Korean Patent Application No. 10-2021-0063619, filed on May 17, 2021, in the Korean Intellectual Property Office, the disclosures of which are incorporated by reference herein in their entirety.

BACKGROUND

1. Field

Embodiments relate to an electronic device, and more particularly, to a portable device and operating method thereof.

2. Description of the Related Art

Wireless earphones are a device for outputting sound from a wirelessly received source signal. Wireless earphones may include a communication module such as a Bluetooth module, to perform short-range wireless communication, and a battery to supply driving power to the communication module. As a dedicated charger for charging the battery of the wireless earphones, a charging case in the form of storing the wireless earphones and also charging the same may be used.

SUMMARY

Embodiments are directed to a portable device, including: a power line communication module configured to perform power line communication with an external device; a memory module configured to store firmware data; and a controller configured to control the power line communication module and the memory module. The power line communication module may transmit an update initiation signal commanding to initiate a firmware update, to the external device, transmit the firmware data to the external device, and transmit an update end signal commanding to end the firmware update to the external device, according to a first response signal transmitted by the external device.

Embodiments are also directed to a portable device, including: a connection pin configured to be connected to an external device; a power line communication module configured to perform power line communication with the external device via the connection pin; a memory module configured to store data; and a controller configured to control the power line communication module and the memory module. The power line communication module may receive updated firmware data from the external device, and provide the updated firmware data to the controller. The controller may perform a validity check based on the updated firmware data in a firmware update mode, and control the memory module to store the updated firmware data in the memory module based on a result of the validity check.

Embodiments are also directed to an operating method of a portable device for performing power line communication with an external device via a connection pin, the operating method including: providing an update initiation signal commanding to initiate a firmware update, to the external device; providing firmware data, which has been previously stored in the portable device, to the external device; and providing an update end signal commanding to end the firmware update to the external device, in response to a response signal transmitted by the external device.

BRIEF DESCRIPTION OF THE DRAWINGS

Features will become apparent to those of skill in the art by describing in detail example embodiments with reference to the attached drawings in which.

DETAILED DESCRIPTION

Figure 1:
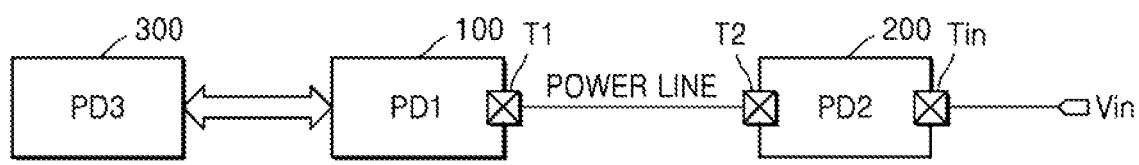
FIG. 1 is a diagram for describing first through third portable devices according to an example embodiment.

FIG. 1 is a diagram for describing first through third portable devices according to an example embodiment.

Referring to FIG. 1, a first portable device 100 may include a connection pin T1. The first portable device 100 may transmit data or a command signal to a second portable device 200 via the connection pin T1. Also, the first portable device 100 may receive data or a response signal from the second portable device 200 via the connection pin T1. The connection pin T1 of the first portable device 100 may be connected to a connection pin T2 of the second portable device 200. The term "connected" described in the present specification may refer to a direct contact or indirect contact between the plurality of connection pins T1 and T2. The first portable device 100 may transmit data or a notification signal to a third portable device 300 wirelessly. Also, the first portable device 100 may wirelessly receive a request signal from the third portable device 300. The first portable device 100 may be a wearable device such as smart glasses, a smart watch, a smart band, or wireless earphones (or earbuds).

The second portable device 200 may include the connection pin T2 and an external voltage pin Tin. The second portable device 200 may receive an external voltage Vin via the external voltage pin Tin. For example, the second portable device 200 may receive the external voltage Vin corresponding to an alternating current source, which is a power source for homes, through the external voltage pin Tin. In another implementation, the second portable device 200 may receive the external voltage Vin from another power supply unit (e.g., a computer or an auxiliary battery) through the external voltage pin Tin. In another implementation, the second portable device 200 may receive the external voltage Vin wirelessly from the outside. The second portable device 200 may be, for example, a charging device.

The first portable device 100 and the second portable device 200 may perform power line communication (PLC). PLC refers to a communication technique for transmitting power and data via a power line.

The third portable device 300 may perform wireless communication with the first portable device 100. The wireless communication may be, for example, Bluetooth. The third portable device 300 may be a computing device, for example, a laptop computer, a tablet PC, or a mobile phone (or smartphone).

The first portable device 100 may be referred to as an external device with respect to the second portable device 200 and the third portable device 300. Likewise, the second portable device 200 may be referred to as an external device with respect to the first portable device 100 and the third portable device 300. The third portable device 300 may be referred to as a host with respect to the first portable device 100 and the second portable device 200. A "portable device" described in the present specification may be referred to as a "mobile equipment," "a portable equipment," "a mobile device," or the like.

Figure 2:
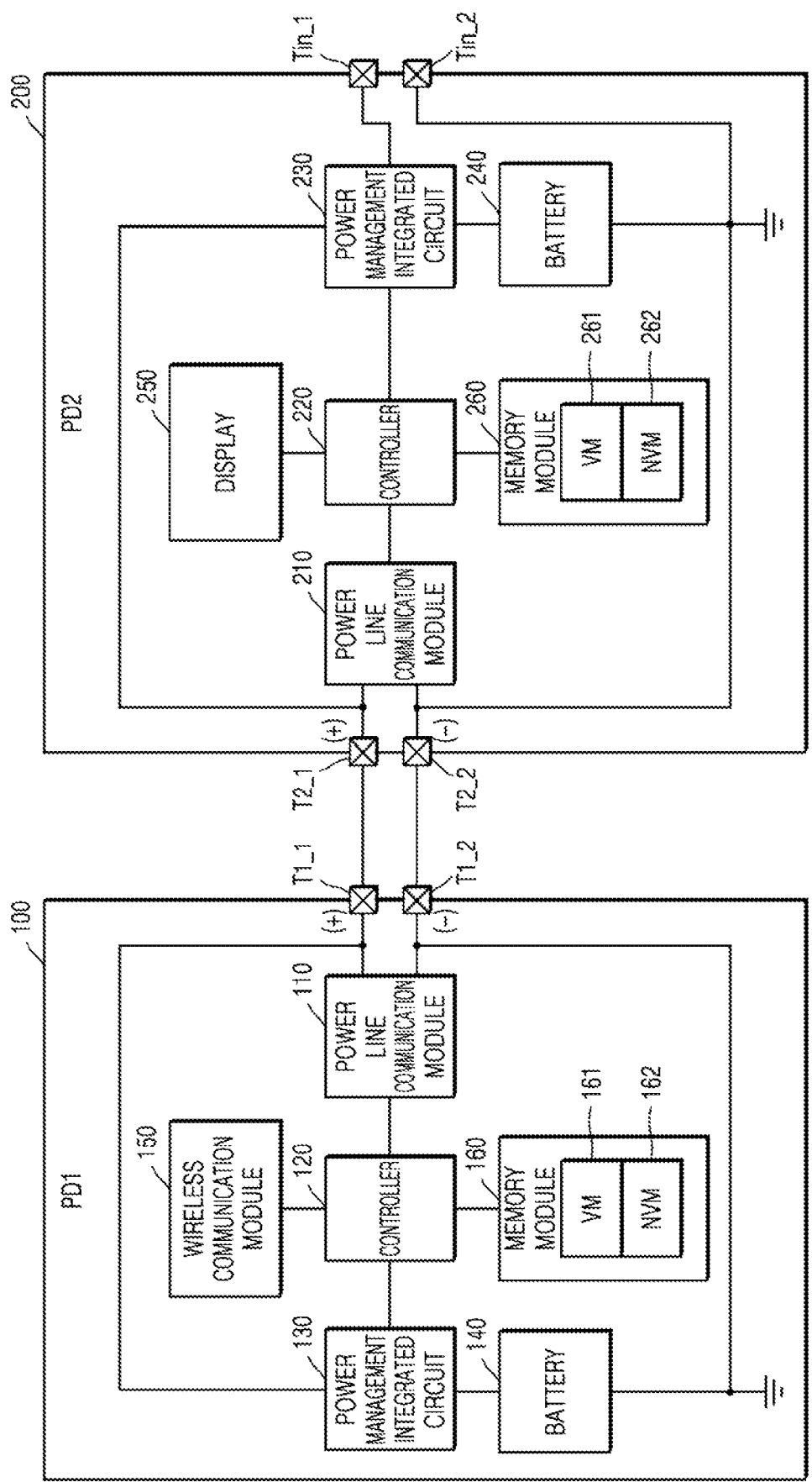
FIG. 2 is a diagram for describing first and second portable devices according to an example embodiment, in further detail.

FIG. 2 is a diagram for describing first and second portable devices according to an example embodiment, in further detail.

Referring to FIG. 2, the first portable device 100 and the second portable device 200 may be connected to each other via first and second connection pins T1_1, T1_2, T2_1, and T2_1. As the first portable device 100 and the second portable device 200 are connected to each other, a power line may be implemented between the first connection pin T1_1 of the first portable device 100 and the first connection pin T2_1 of the second portable device 200 and a power line may be implemented between the second connection pin T1_2 of the first portable device 100 and the second connection pin T2_2 of the second portable device 200. The first portable device 100 and the second portable device 200 may perform PLC via the power lines. A power line implemented between the first connection pin T1_1 of the first portable device 100 and the first connection pin T2_1 of the second portable device 200 may be a line through which a positive voltage or current is transferred. Also, a power line implemented between the second connection pin T1_2 of the first portable device 100 and the second connection pin T2_2 of the second portable device 200 may be a line through which a negative voltage or current is transferred. However, the number of power lines and voltages and currents transferred via each power line may be varied. As the first and second portable devices 100 and 200 perform power line communication (PLC) via the first and second connection pins T1_1, T1_2, T2_1, and T2_1, there is no need to additionally provide connection pins for performing data communication, and thus, the manufacturing costs may be reduced, and the sizes of the first and second portable devices 100 and 200 may be reduced.

The first portable device 100 may include a power line communication module 110, a controller 120, a power management integrated circuit 130, a battery 140, a wireless communication module 150, and a memory module 160.

The power line communication module 110 may receive power from the second portable device 200 in response to the control by the controller 120. The power line communication module 110 may transmit or receive data to or from the second portable device 200 in response to the control by the controller 120. The power line communication module 110 may modulate a current signal to be transmitted to the second portable device 200. The power line communication module 110 may demodulate a voltage signal received from the second portable device 200.

The power line communication module 110 may transmit an update initiation signal to the second portable device 200. The update initiation signal may be a signal commanding initiation of a firmware update. Firmware update may refer to update of firmware of the second portable device 200.

After the update initiation signal is transmitted to the second portable device 200, the power line communication module 110 may transmit an erase command signal to the second portable device 200. The erase command signal may be a signal commanding to erase firmware data stored in the second portable device 200.

After the erase command signal is transmitted to the second portable device 200, the power line communication module 110 may transmit firmware data to the second portable device 200. The firmware data may include data including information about firmware of the second portable device 200 and may be referred to as a firmware image.

The power line communication module 110 may transmit an update end signal to the second portable device 200 according to a response signal from the second portable device 200. The update end signal may be a signal commanding to end firmware update. This will be described in more detail later with reference to FIG. 3.

The controller 120 may control the overall operation of the first portable device 100. The controller 120 may control the power management integrated circuit 130 to perform a charging operation based on power received from the second portable device 200. The controller 120 may control the power line communication module 110 to perform a communication operation on the second portable device 200. The controller 120 may control the wireless communication module 150 to perform a communication operation with respect to the third portable device 300. The controller 120 may control the memory module 160 to store data received from the second portable device 200. The controller 120 may include a micro control unit (MCU), a processor such as a central processing unit (CPU), etc.

The power management integrated circuit 130 may charge the battery 140 by using different charging methods according to a charging state of the battery 140. For example, the power management integrated circuit 130 may charge the battery 140 by using a pre-charging method, a constant-current method, a constant-voltage method, or a trickle charging method, according to the increase in a charging voltage of the battery 140. The power management integrated circuit 130 may charge the battery 140 by using the pre-charging method when the battery 140 is over-discharged. The power management integrated circuit 130 may charge the battery 140 by using the constant current method and the constant voltage method when the battery 140 is in a normal state. The power management integrated circuit 130 may charge the battery 140 by using the trickle method when the battery 140 is in a fully-charged state.

The battery 140 may be charged with power supplied from the power management integrated circuit 130. A charging state of the battery 140 may include an over-discharged state, a normal state, and a fully-charged state. The battery 140 may be implemented using, e.g., a rechargeable secondary battery or a fuel cell.

The wireless communication module 150 may perform wireless communication with the third portable device 300. To perform a firmware update, the wireless communication module 150 may receive firmware data for execution in the second portable device 200, from the third portable device 300, and provide the received firmware data to the controller 120. The wireless communication module 150 may receive a signal for requesting a firmware update from the third portable device 300, and provide the received signal to the controller 120.

The power line communication module 110 may receive another response signal from the second portable device 200, and the controller 120 may generate a notification signal for requesting display of a message on the third portable device 300, in response to the other response signal. The wireless communication module 150 may transmit the notification signal to the third portable device 300.

The memory module 160 may include a volatile memory 161 and a non-volatile memory 162. The volatile memory 161 may include dynamic random access memory (DRAM), static random access memory (SRAM), or the like. The non-volatile memory 162 may store data or signals regardless of whether power is supplied or not. The non-volatile memory 162 may include, e.g., a NAND flash memory, NOR flash memory, or the like.

The memory module 160 may store data. The memory module 160 may store first firmware data executed in the first portable device 100. The memory module 160 may store second firmware data executed in the second portable device 200. The volatile memory 161 may temporarily store a signal received from the second portable device 200 and data transmitted by the third portable device 300, only during a power receiving period. The second firmware data executed in the second portable device 200 may be stored in the non-volatile memory 162 before the signal for firmware update described above is transmitted to the first portable device 100.

The second portable device 200 may include a power line communication module 210, a controller 220, a power management integrated circuit 230, a battery 240, a display 250, and a memory module 260. The second portable device 200 may include external voltage pins Tin_1 and Tin_2, via which an external voltage Vin may be received from the outside. For example, the external voltage pins Tin_1 and Tin_2 may receive the external voltage Vin from an alternating current source, which is a power source for homes or other power supply units (e.g., a computer or an auxiliary battery). The second portable device 200 may also receive the external voltage Vin wirelessly from the outside.

The power line communication module 210 may transmit power to the first portable device 100 in response to the control by the controller 220. The power line communication module 210 may receive data (e.g., firmware data) or a signal (e.g., an update initiation signal, an erase signal, or an update end signal) from the first portable device 100 in response to the control by the controller 220. The power line communication module 210 may transmit a response signal to the first portable device 100 in response to the control by the controller 220. The power line communication module 210 may modulate a voltage signal to be transmitted to the first portable device 100. The power line communication module 210 may demodulate a current signal received from the first portable device 100.

The controller 220 may control the overall operation of the second portable device 200. For example, the controller 220 may control the power management integrated circuit 230 such that power is supplied to the second portable device 200. The controller 220 may control the power line communication module 210 to perform a communication operation on the first portable device 100. The controller 220 may control the display 250 to perform a display operation of displaying a charge amount of the battery 240, a state of the second portable device 200, or the like. The controller 220 may control the memory module 260 to store data received from the first portable device 100. The controller 220 may include a processor such as an MCU or a CPU.

The controller 220 may load firmware data from the memory module 260 when the second portable device 200 is booted, and execute a user mode based on the firmware data.

The controller 220 may enter a firmware update mode from the user mode in response to an update initiation signal received by the power line communication module 210. In the firmware update mode, the controller 220 may perform a validity check based on updated firmware data provided by the first portable device 100. The validity check may be a check on whether firmware data provided by the first portable device 100 is valid data. The validity check may be, for example, a cyclic redundancy check.

The controller 220 may control the memory module 260 such that updated firmware data is stored in the memory module 260 according to a result of the validity check. The updated firmware data may be stored in a non-volatile memory 262 included in the memory module 260, and firmware data that was previously stored in the non-volatile memory 262 may be processed as invalid.

The controller 220 may monitor whether the first and second connection pins T2_1 and T2_2 are connected to the first connection pins T1_1 and T1_2 of the first portable device 100, respectively, and may generate a response signal for notifying release of the connection pins T1_1, T1_2, T2_1, and T2_2. The power line communication module 210 may transmit the response signal to the first portable device 100. In response to the response signal, the first portable device 100 may transmit, to the third portable device 300, a notification signal for requesting display of a message on the third portable device 300.

The controller 220 may compare a charge amount of the battery 240 with a preset reference amount, and may control the power management integrated circuit 230 to block the external voltage Vin based on whether the charge amount of the battery 240 is greater than the preset reference amount.

The power management integrated circuit 230 may charge the battery 240 based on the external voltage Vin received from the outside. The power management integrated circuit 230 may generate a charging voltage to be provided to the battery 240, based on the external voltage Vin. The power management integrated circuit 230 may include a converter (not shown) generating a conversion voltage from the external voltage Vin revived from the outside via the external voltage pins Tin_1, Tin_2 or from a battery voltage of the battery 240. The converter may be a DC-DC converter. The converter may be a step-up converter converting a relatively low external voltage Vin or a battery voltage into a higher conversion voltage (e.g., a boost converter), or a step-down converter converting a relatively high external voltage Vin or a battery voltage into a lower conversion voltage (e.g., a buck converter).

The battery 240 may be charged based on a charging voltage supplied from the power management integrated circuit 230.

The memory module 260 may include a volatile memory 261 and the non-volatile memory 262, like the memory module 160 included in the first portable device 100.

In the present example embodiment, the first portable device 100 transmitting firmware data to the second portable device 200 is described, but the second portable device 200 may be implemented to transmit firmware data of firmware of the first portable device 100 via PLC.

Figure 3:
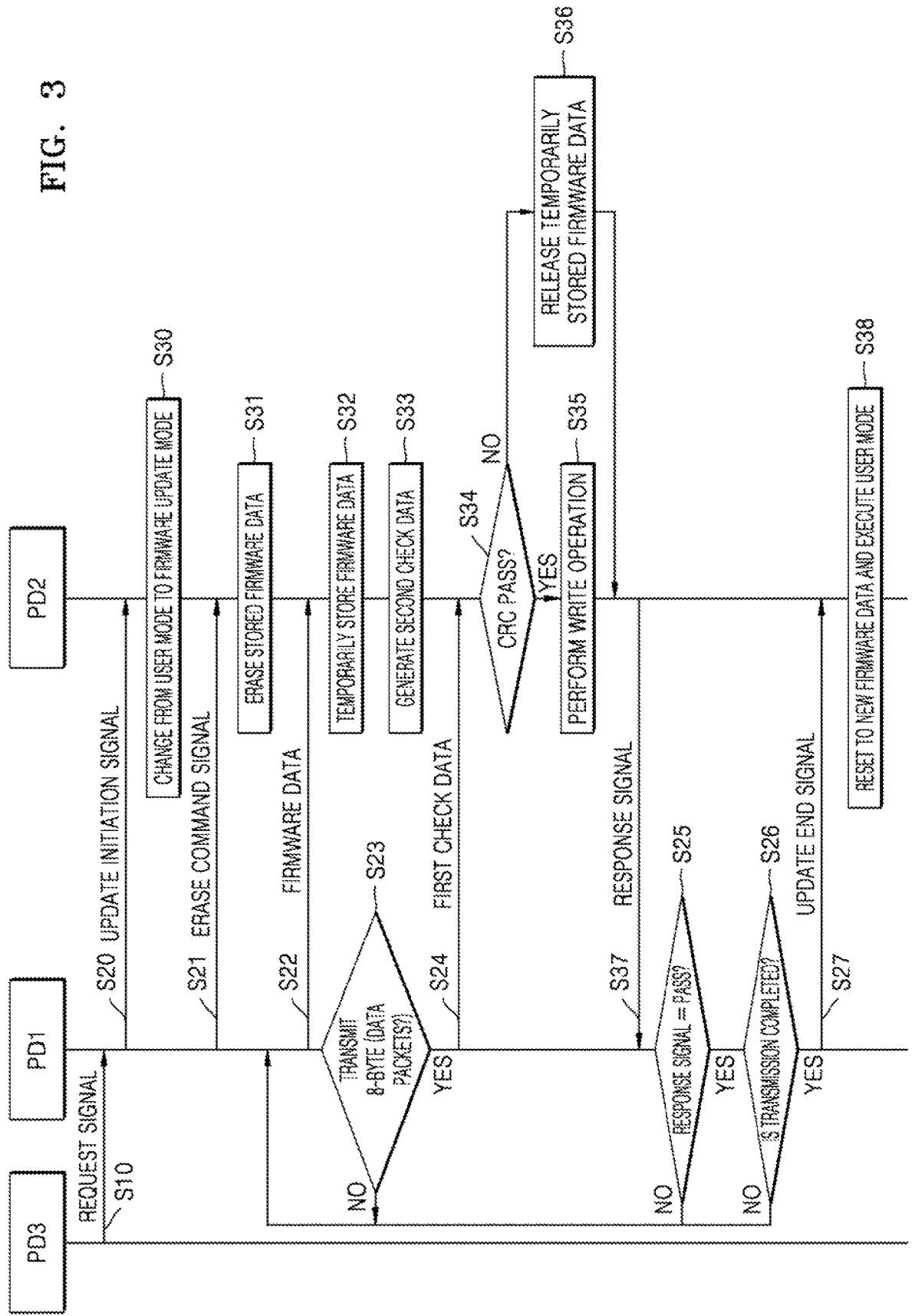
FIG. 3 is a diagram for describing a first operating method of first through third portable devices, according to an example embodiment.

FIG. 3 is a diagram for describing a first operating method of first through third portable devices, according to an example embodiment.

Referring to FIG. 3, a first portable device PD1 illustrated in FIG. 3 may correspond to the first portable device 100 illustrated in FIG. 1, and a second portable device PD2 illustrated in FIG. 3 may correspond to the second portable device 200 illustrated in FIG. 1, and a third portable device PD3 illustrated in FIG. 3 may correspond to the third portable device 300 illustrated in FIG. 1.

In the present example embodiment, in operation S10, the third portable device PD3 transmits a request signal to the first portable device PD1 via wireless communication. The request signal generated by the third portable device PD3 may be a signal for requesting to update firmware of the second portable device PD2. Referring to FIG. 2, for example, a user may command initiation of a firmware update in an application or software of the third portable device PD3, and the third portable device PD3 may transmit a request signal to the first portable device 100 via wireless communication, and the wireless communication module 150 included in the first portable device 100 may receive the request signal from the third portable device PD3.

In operation S20, the first portable device PD1 transmits an update initiation signal to the second portable device PD2 in response to the request signal. Referring to FIG. 2, for example, the controller 120 included in the first portable device 100 may generate an update initiation signal in response to a request signal, and provide the update initiation signal to the power line communication module 110, and may control the power line communication module 110 to transmit the update initiation signal to the second portable device 200 via PLC.

In operation S30, the second portable device PD2 changes from a user mode to a firmware update mode in response to the update initiation signal. Referring to FIG. 2, for example, the controller 220 included in the second portable device 200 may enter the firmware update mode in response to an update initiation signal provided from the power line communication module 210.

In operation S21, the first portable device PD1 provides an erase command signal after the update initiation signal is transmitted. Referring to FIG. 2, for example, the controller 120 may generate an erase command signal, provide the same to the power line communication module 110, and control the power line communication module 110 to transmit the erase command signal. The power line communication module 110 may transmit the erase command signal to the second portable device PD2 before the firmware data is provided to the second portable device 200.

In operation S31, the second portable device PD2 erases previously stored firmware data in response to the erase command signal. Referring to FIG. 2, for example, the power line communication module 210 may receive the erase command signal after the update initiation signal is received, and provide the erase command signal to the controller 220. In response to the erase command signal, the controller 220 may control the non-volatile memory 262 to erase firmware data stored in the non-volatile memory 262.

In operation S22, the first portable device PD1 transmits the updated firmware data to the second portable device PD2 after the erase command signal is transmitted. Referring to FIG. 2, for example, the power line communication module 110 may transmit the updated firmware data to the second portable device 200. In this case, the firmware data to be transmitted to the second portable device 200 may be divided or split and transmitted in units of data packets having a first size. For example, firmware data to be transmitted to the second portable device 200 may be divided into 1-byte data packets, and the 1-byte data packets may be sequentially transmitted to the second portable device 200.

In operation S32, the second portable device PD2 temporarily stores the firmware data that is divided or split and transmitted in units of data packets. Referring to FIG. 2, for example, the controller 220 may control the volatile memory 261 to temporarily store a 1-byte data packet received through the power line communication module 210, in the volatile memory 261.

In operation S23, the first portable device PD1 determines whether a predefined number of data packets have been transmitted to the second portable device PD2. The predefined number may be, for example, 8, and when 8 data packets are transmitted to the second portable device PD2 (operation S23, YES), the first portable device PD1 transmits first check data regarding a cyclic redundancy check performed on the data packets, to the second portable device PD2 (operation S24). That is, each time 8-byte data packets are transmitted to the second portable device PD2, the first check data may be transmitted to the second portable device PD2. On the other hand, when 8 data packets are not transmitted to the second portable device PD2 (operation S23, NO), operation my return to operation S22.

In operation S33, the second portable device PD2 generates second check data based on the temporarily stored firmware data.

Then, in operation S34, the second portable device PD2 checks whether a validity check, that is, a cyclic redundancy check, is a pass, by using the first check data and the second check data). Whether the cyclic redundancy check is a pass may be determined based on whether the first check data and the second check data match. The controller 220 may control the non-volatile memory 262 to store updated firmware data in the non-volatile memory 262 according to a result of the validation check. According to this, by checking whether there are errors in a data packets, errors in firmware data may be reduced.

When a result of the cyclic redundancy check is a pass (operation S34, YES), in operation S35 the second portable device PD2 performs a write operation. The write operation may be an operation of storing data in a non-volatile memory. Referring to FIG. 2, for example, in response to a result of the validation check, the result being a pass, the controller 220 may control the non-volatile memory 262 to store updated firmware data by transmitting 8-byte data packets and a write command/address to the non-volatile memory 262.

On the other hand, when the result of the cyclic redundancy check is a fail (operation S34, NO), the second portable device PD2 releases the temporarily stored firmware data in operation S36. The release of the temporarily stored firmware data may be an operation that erases or flushes data stored in a volatile memory. Referring to FIG. 2, for example, in response to the result of the validation check being a fail, the controller 220 may control the volatile memory 261 to delete 8-byte data packets temporarily stored in the volatile memory 261.

In operation S37, the second portable device PD2 transmits a response signal indicating a pass or a fail of the cyclic redundancy check to the first portable device PD1. Referring to FIG. 2, for example, the controller 220 may control the power line communication module 210 to transmit a response signal indicating that the result of the validation check is a fail, to the first portable device 100.

In operation S25, the first portable device PD1 checks whether the response signal is a pass.

When the response signal indicates a fail (operation S25, NO), the operation returns to operation S22 and firmware data is divided and transmitted in units of 1 byte-data packets.

On the other hand, when the response signal indicates a pass (operation S25, YES), the first portable device PD1 determines whether all firmware data is transmitted in operation S26. Until all the firmware data is transmitted, the above-described operations S22 to S25 and S32 to S37 are performed.

When the response signal indicates a pass (operation S25, YES), the first portable device PD1 transmits an update end signal to the second portable device PD2 in operation S27. Referring to FIG. 2, for example, when the response signal indicates a pass, the controller 120 may generate an update end signal and provide the same to the power line communication module 110, and control the power line communication module 110 to transmit the update end signal.

On the other hand, when the response signal indicates a fail (operation S25, NO), the operation returns to operation S22 and the controller 120 may control the power line communication module 110 to transmit the firmware data stored in the non-volatile memory 162 back to the second portable device 200. Also when the firmware data is transmitted again, the firmware data may be transmitted in units of 1 byte data packets. Meanwhile, the power line communication module 210 may receive the firmware data again after the response signal is transmitted to the first portable device 100.

In operation S38, the second portable device PD2 resets with the stored firmware data, i.e., new firmware data, in response to the update end signal, and executes a user mode.

According to the above, firmware of a portable device may be updated simply and quickly compared to firmware update done by visiting a service center or through a separate compile function, such as, zig.

Figure 4:
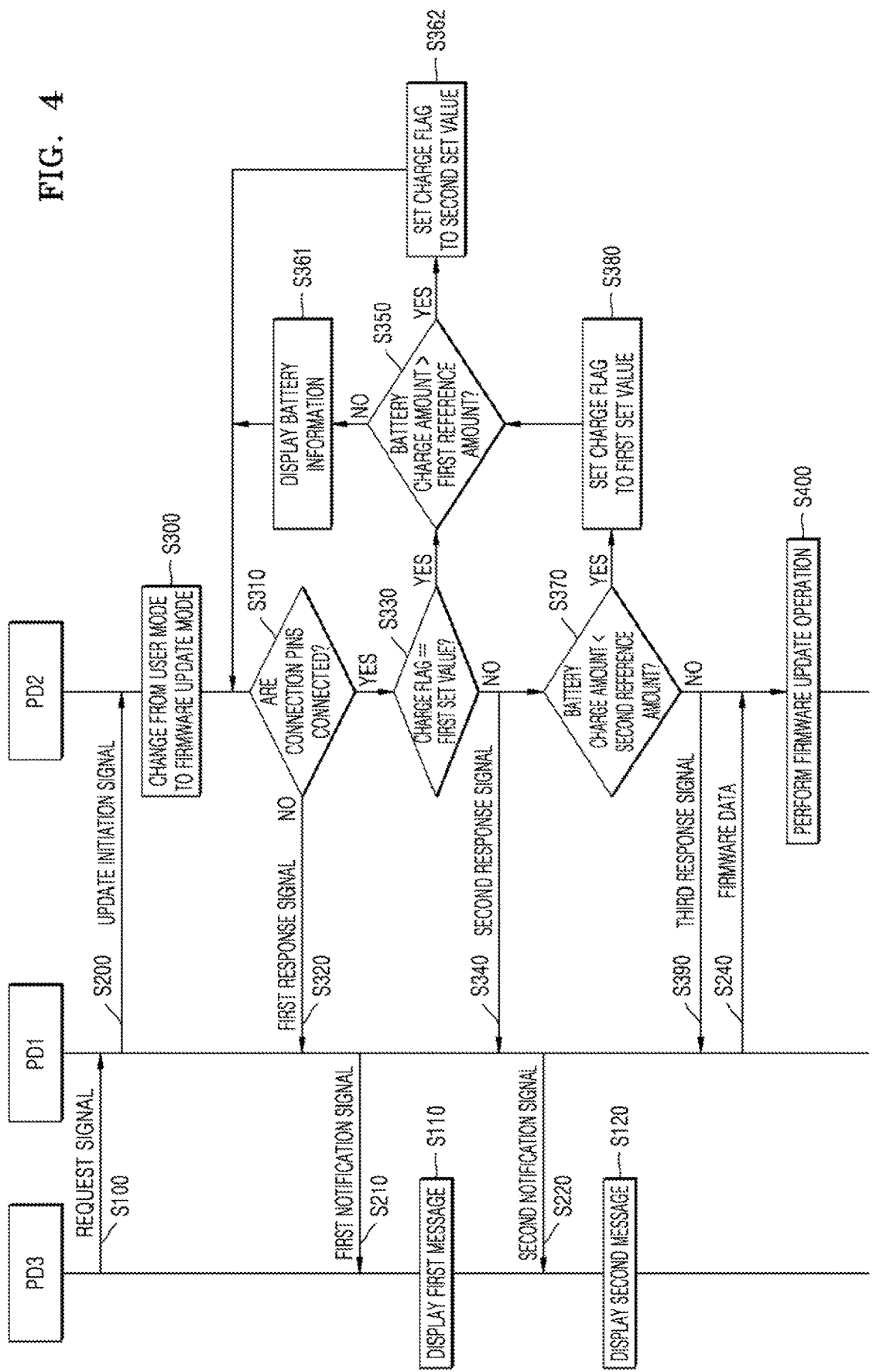
FIG. 4 is a diagram for describing a second operating method of first through third portable devices, according to an example embodiment.

FIG. 4 is a diagram for describing a second operating method of first through third portable devices, according to an example embodiment.

Referring to FIG. 4, operations S100, S200, and S300 are respectively the same as operations S10, S20, and S30 described above, and thus, the description thereof will be omitted.

In operation S310, the second portable device PD2 monitors whether a connection pin provided in the second portable device PD2 and a connection pin provided in the first portable device PD1 are connected to each other. Referring to FIG. 2, for example, the controller 220 included in the second portable device 200 may monitor whether the first and second connection pins T2_1 and T2_2 of the second portable device 200 and the first and second connection pins T1_1 and T1_2 of the first portable device 100 are respectively in contact with each other.

When the connection between the connection pins is abnormal or bad (operation S310, NO), the second portable device PD2 transmits a first response signal to the first portable device PD1 in operation S320. In response to the first response signal, the first portable device PD1 transmits a first notification signal indicating that the contact between the connection pins is bad, to the third portable device PD3 in operation S210. The third portable device PD3 may display a first message in response to the first notification signal. For example, the first message may indicate "reconnect the connection pins to complete firmware update" or the like.

On the other hand, when the connection of the connection pins is normal (operation S310, YES), the second portable device PD2 monitors whether a charge flag has a first set value in operation S330. The charge flag may indicate whether the power management integrated circuit 230 receives the external voltage Vin and charges the battery 240. The charge flag may have a first set value (e.g., true) or a second set value (e.g., false). The charge flag having the first set value may indicate that the power management integrated circuit 230 is charging the battery 240. The charge flag having the second set value may indicate that charging of the battery 240 is stopped. The first portable device PD1 may stop a wireless communication operation on the third portable device PD3. For example, the first portable device PD1 may turn off Bluetooth of the third portable device PD3. As the wireless communication is stopped, the influence of noise by the third portable device PD3 may be reduced.

When the charge flag does not have the first set value (operation S330, NO), the second portable device PD2 transmits a second response signal to the first portable device PD1 in operation S340. In response to the second response signal, the first portable device PD1 transmits a second notification signal indicating that firmware is being updated, to the third portable device PD3 in operation S220. The third portable device PD3 may display a second message in response to the second notification signal. For example, the second message may indicate "updating firmware" or the like.

On the other hand, when the charge flag has the first set value (operation S330, YES), the second portable device PD2 monitors whether a charge amount of the battery 240 is greater than a first reference amount in operation S350.

When the charge amount of the battery 240 is not greater than the first reference amount (operation S350, NO), the second portable device PD2 displays battery information about the battery 240, such as the charge amount, in operation S361. Referring to FIG. 2, for example, the controller 220 may control the display 250 to display battery information.

When the charge amount of the battery 240 is greater than the first reference amount (operation S350, YES), the second portable device PD2 sets a set value of the charge flag to the second set value in operation S362. Referring to FIG. 2, for example, the controller 220 may control the power management integrated circuit 230 to stop a charging operation by setting the set value of the charge flag to the second set value. Accordingly, the amount of heat generated in the second portable device PD2 may be reduced, and the influence of noise caused by the external voltage Vin during PLC may be reduced. Accordingly, the time for transmitting the firmware data may be shortened. The first portable device PD1 may transmit a notification signal informing that the firmware update is to restart, to the third portable device PD3.

After each of operations S361 and S362 is performed, operation S310 is performed again.

Referring again to operation S330, when the charge flag does not have the first set value (operation S330, NO), because the charge flag has the second set value, the charge amount of the battery 240 is reduced. After the second response signal is transmitted to the first portable device PD1, the second portable device PD2 monitors whether the charge amount of the battery 240 is less than a second reference amount (operation S370). The first reference amount may be greater than the second reference amount.

When the battery charge amount is less than a second reference amount (operation S370, YES), the second portable device PD2 sets the value of the charge flag to the first set value in operation S380. When the charge flag has the first set value, the battery 240 may be charged as described above.

On the other hand, when the the battery charge amount is not less than the second reference amount (operation S370, NO), the second portable device PD2 transmits a third response signal to the first portable device PD1 in operation S390.

In operation S240, the first portable device PD1 transmits firmware data to the second portable device PD2 in response to the third response signal.

In operation S400, the second portable device PD2 performs a firmware update operation. The firmware update operation according to operation S400 may indicate that operations S22 to S25 and S32 to S37 described above with reference to FIG. 2 are performed.

Figure 5:
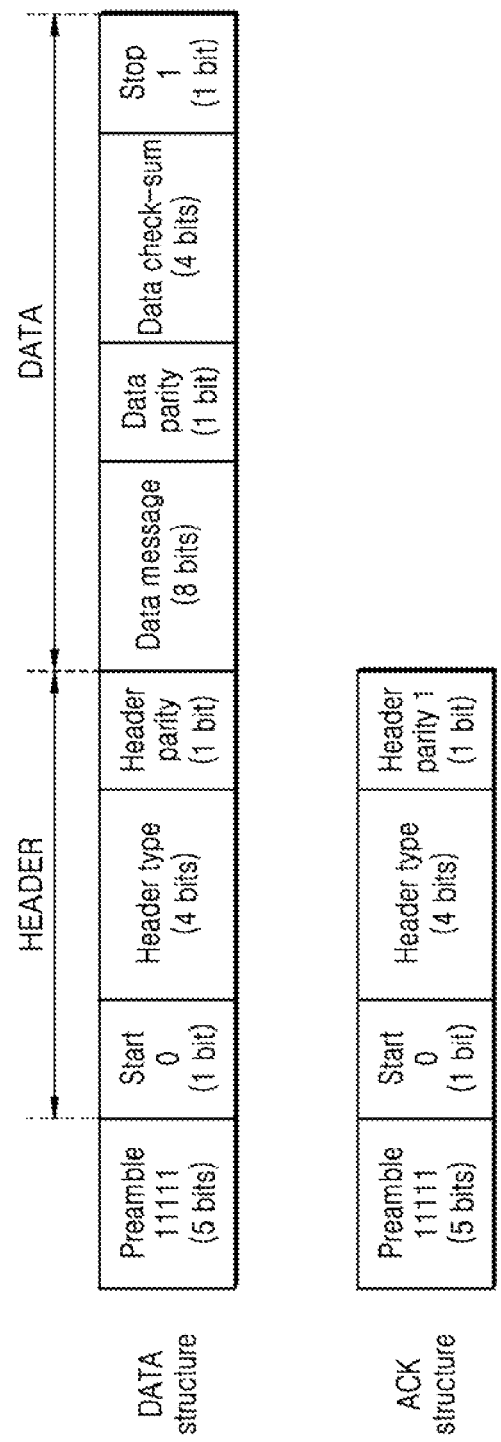
FIG. 5 is a diagram illustrating an example of structures of data and a response signal transmitted between first and second portable devices.

FIG. 5 is a diagram illustrating an example of structures of data and a response (ACK) signal transmitted between first and second portable devices.

Referring to FIG. 5, a data structure may be divided into a preamble, a header, and data. Each of the preamble, header, and data may include a plurality of fields.

In an example embodiment, a period of a preamble may have five periods. In addition, as all of preamble signals are toggled in each period, all logic values of the preamble signals may have a value of "1."

The header may include a start field, a header type field, and a header parity field. The start field may include one bit and may correspond to information indicating a start of data transmission. The header type field indicates a type of data and may include one or more bits (e.g., four bits). The header parity field is used to determine validity of transmitted header information and may include one bit.

The data may include a data message field, a data parity field, a data checksum field, and an end field. The data message field may include actual data having a plurality of bits. The data parity field is used to determine the validity of data and may include one bit. The data checksum field is used to detect errors in data and may include a plurality of bits. The end field is used to indicate an end of data transmission and may include one bit.

A header of an update initiation signal may be expressed as "0x1", and data of the update initiation signal may be expressed as "0 x10." A header of an erase command signal may be expressed as "0x1", and the data of the erase command signal may be expressed as "0x44." A header of a data packet may be expressed as "0xA." A header of check data may be expressed as "0xF." A header of an update end signal may be expressed as "0xE," and data of the update end signal may be expressed as "0x10."

In order to increase the reliability of data transmission/reception, the second portable device 200 may transmit the response signal ACK. The response signal ACK may be transmitted once after data reception. The response signal ACK may have a shorter field structure than data. Accordingly, the time for transmitting the response signal ACK may be shortened.

The response signal ACK may include a preamble, a start field, a header type field, and a header parity field. The preamble may be the same as that described above. The start field may include one bit and may correspond to information indicating a start of transmission of the response signal ACK. The header type field may include at least one bit (e.g., four bits) and may indicate a type of the response signal ACK. The header parity field may include one bit and may be transmitted to determine the validity of header information.

A response signal indicating a pass may be expressed as "0x55." A response signal indicating a fail may be expressed as "0xFF."

On the other hand, in transmission/reception of data or the response signal ACK, when expressing one bit, when there is a toggle within one data cycle, logic "1" may be represented, and when there is no toggle, logic "0" may be represented. Also, because the preamble period is a period in which a frequency and duty are detected, the frequency and duty are not to be changed within the preamble period until data transmission/reception is performed.

Figure 6:
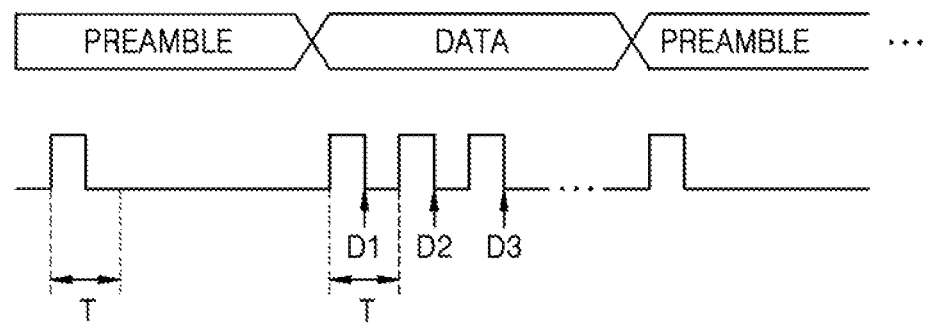
FIG. 6 is a diagram for describing a preamble period and a data period.

FIG. 6 is a diagram for describing a preamble period and a data period.

In describing the example embodiment illustrated in FIG. 6, it is assumed that the first portable device 100 transmits data, and the second portable device 200 receives data.

Referring to FIG. 6, before data is transmitted, the second portable device 200 may enter a preamble period, and the second portable device 200 may receive a preamble signal that is toggled at least once in the preamble period. FIG. 2 illustrates an example in which the preamble signal is toggled once, and the second portable device 200 may detect a frequency and duty of the preamble signal through the preamble signal that is toggled at least once.

As an example, when a duty ratio of the preamble signal is set to 1:1, the frequency (or cycle (T)) of the preamble signal is detected by detecting a logic high period or a logic low period of the preamble signal. The second portable device 200 may perform various setting operations related to data reception based on the detected frequency of the preamble signal. As an example, the cycle T of the preamble signal corresponds to a data period including one bit in a data transmission period, and the second portable device 200 may perform an internal setting operation to determine data in each data cycle according to the detected frequency.

Next, the second portable device 200 may determine data D1, D2, and D3 based on a preset condition in each data cycle. As an example, a timing (or period) for determining whether toggling of a voltage signal (or an internal signal) exists in each data cycle in each data period may be set based on a duty of a preamble signal, and when the toggling of the voltage signal is present in each data period, data of logic high may be determined, whereas, when there is no toggling of the voltage signal, data of logic low may be determined.

FIG. 3 illustrates an example in which a preamble period includes a plurality of periods. While FIG. 3 illustrates an example in which a preamble period includes three periods and a preamble signal is transmitted in each period, various numbers of preamble signals may be transmitted.

A preamble signal may be transmitted to the second portable device 200 through a power line, and a signal applied to the power line before a preamble period may have an initial state. Thereafter, as the preamble period starts, a preamble signal may be transmitted in each of first to third periods, and the first to third periods have the same time period, and duties D of the preamble signals may be identical to each other. The second portable device 200 may detect a frequency and duty of the preamble signal, based on the preamble signal received in each of the first to third periods.

The frequency and duty of the preamble signal may be variously set, and a detection operation thereof may also be performed using various methods. For example, as preamble signals having the same frequency and duty are transmitted in each of the first to third periods, the frequency and duty of the preamble signals may be detected. Alternatively, at least one of a frequency and a duty of preamble signals in each of the first to third periods may be different from the other, and the second portable device 200 may calculate an average value of the frequencies and duties of the preamble signals in a plurality of periods to detect the frequencies and duties of the preamble signals.

An example of an operation of transmitting and detecting a preamble signal will be described as below.

The second portable device 200 transmitting power may provide a voltage signal, and a level of the voltage signal transmitted through the power line may swing at an appropriate level that does not affect an operation of the second portable device 200 that receives the power. The second portable device 200 may perform voltage modulation to provide a preamble signal, and the frequency (or cycle) of the preamble signal may have a value that is slower than a limit clock (e.g., system clock) of the second portable device 200. For example, the frequency of the limit clock of the second portable device 200 may be 20 times or more fast than the frequency of the preamble signal.

Although an initial state before the preamble period is shown as logic low, the preamble signal may be toggled once in each of a plurality of periods of a preamble period. Also, the second portable device 200 may perform a voltage modulation operation such that duties of preamble signals in a plurality of periods are the same. The first portable device 100 may analyze the preamble signal by using the limit clock and detect a frequency (or cycle) and duty of the preamble signal by using the analyzed preamble signal.

Figure 7:
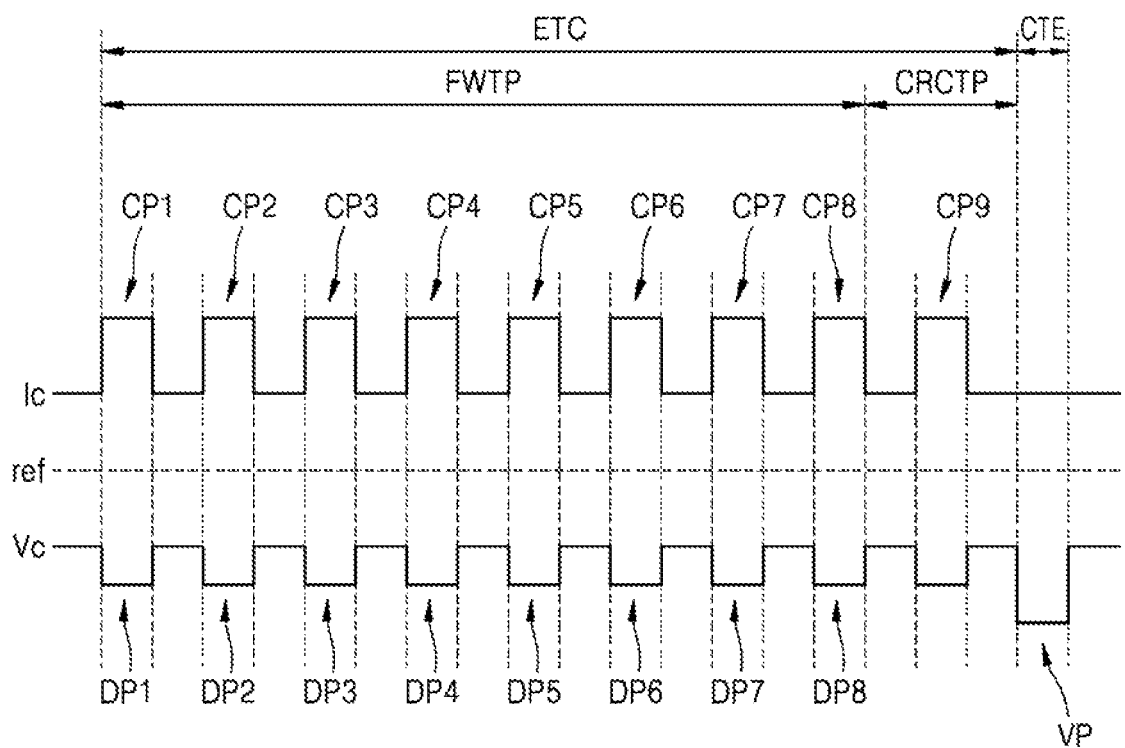
FIG. 7 is a diagram for describing modulation of signals transmitted between first and second portable devices, according to an example embodiment.

FIG. 7 is a diagram for describing modulation of signals transmitted between first and second portable devices, according to an example embodiment.

Referring to FIG. 7, a current signal Ic may be a signal transmitted by the first portable device 100 to the second portable device 200 via PLC. A voltage signal Vc may be a signal transmitted by the second portable device 200 to the first portable device 100 via PLC.

A first communication period ETC may be a period in which the first portable device 100 modulates the current signal Ic to transmit firmware data or check data to the second portable device 200. The first communication period ETC may be divided into a firmware data transmission period FWTP and a check data transmission period CRCTP. A second communication period CTE may be a period in which the second portable device 200 modulates the voltage signal Vc to transmit a response signal to the first portable device 100.

A logic level of the current signal Ic may be higher than a reference level ref. The current signal Ic may be modulated during the first communication period ETC. The modulated current signal Ic may be a signal in the form of a pulse having a certain logic level. During the first communication period ETC, each time the current signal Ic is modulated in the firmware data transmission period FWTP, firmware data of a 1 byte data packet may be transmitted to the second portable device 200. Referring to FIG. 7, for example, each of first through eighth current pulses CP1 through CP8 may correspond to a 1 byte-data packet with respect to firmware data. It may be understood that 8 byte-data packets are transmitted to the second portable device 200c via the first through eighth current pulses CP1 through CP8. During the first communication period ETC, a ninth current pulse CP9 may be formed in the check data transmission period CRCTP. The ninth current pulse CP9 may correspond to check data.

Meanwhile, a logic level of the voltage signal Vc may be lower than the reference level ref. The voltage signal Vc may have a form of first through eighth pulses DP1 through DP8 by the current signal Ic modulated during the first communication period ETC. The voltage signal Vc may be modulated during the second communication period CTE. A voltage pulse VP in the second communication period CTE may correspond to a response signal.

Figure 8:
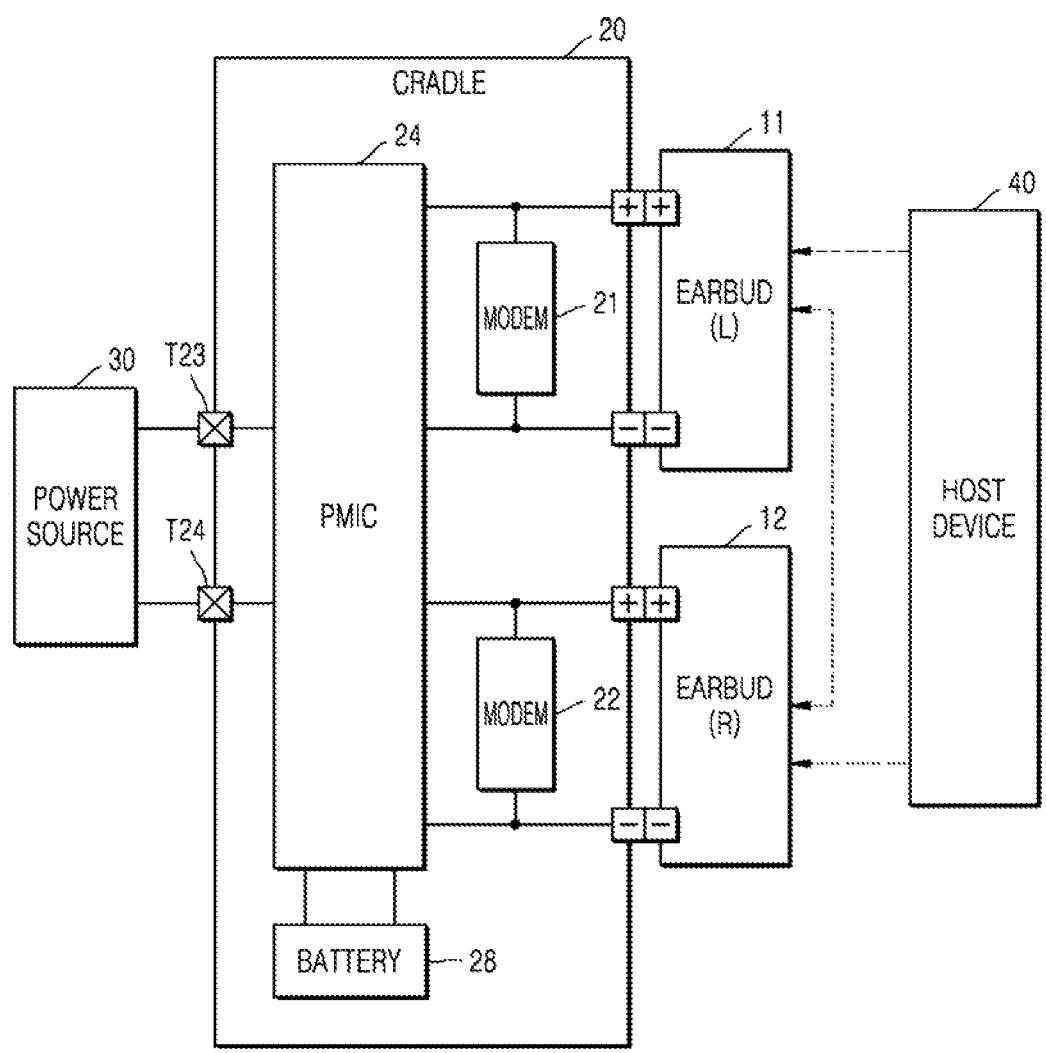
FIG. 8 is a diagram for describing portable devices according to another example embodiment.

FIG. 8 is a diagram for describing portable devices according to another example embodiment.

FIG. 8 illustrates first and second earbuds 11 and 12, a cradle 20 for the first and second earbuds 11 and 12, a power source 30 connected to the cradle 20, and a host device 40 performing wireless communication with the first and second earbuds 11 and 12.

Hereinafter, description of details regarding the example embodiment of FIG. 8 provided above may be omitted.

Each of the first and second earbuds 11 and 12 may correspond to the first portable device 100 illustrated in FIG. 1. The cradle 20 may correspond to the second portable device 200 illustrated in FIG. 1. The host device 40 may correspond to the third portable device 300 illustrated in FIG. 1.

The first and second earbuds 11 and 12 may perform wireless communication with the host device 40, and output sound from a source signal received from the host device 40. The first and second earbuds 11 and 12 may perform mutual wireless communication with each other. For example, the first and second earbuds 11 and 12 may perform mutual wireless communication for the purpose of synchronization, transferring of states, or the like. Each of the first and second earbuds 11 and 12 may include a battery that is charged by power supplied from the cradle 20, and may efficiently and completely perform power line communication with the cradle 20. Accordingly, in the first and second earbuds 11 and 12, in addition to a pair of terminals for charging, an additional terminal for communicating with the cradle 20 may be omitted, and the first and second earbuds 11 and 12 and the cradle 20 may have a simple structure. In particular, due to the compact size of the first and second earbuds 11 and 12 and the cradle 20, the simple structure of the first and second earbuds 11 and 12 and the cradle 20 may provide various advantages.

The cradle 20 may function as a charger of the first and second earbuds 11 and 12 and may be portable. For example, the cradle 20 may include a battery 28, and may charge the first and second earbuds 11 and 12 from power provided by the battery 28. In addition, the cradle 20 may include a third terminal T23 and a fourth terminal T24 to be connected to the power source 30, and the first and second earbuds 11 and 12 may be charged with power provided by the power source 30 to the battery 28. The cradle 20 may function as a case for the first and second earbuds 11 and 12. For example, the cradle 20 may have an internal structure in which the first and second earbuds 11 and 12 are seated, and may include a cover covering the first and second earbuds 11 and 12.

Referring to FIG. 8, the cradle 20 may include a first modem 21, a second modem 22, a power management integrated circuit (PMIC) 24, and the battery 28.

The first modem 21 may perform power line communication with the first earbud 11.

The second modem 22 may perform power line communication with the second earbud 12.

The PMIC 24 may provide power (supplied from power provided from the power source 30 and/or the battery 28) to the first and second earbuds 11 and 12. For example, the power source 30 may provide a 5V DC voltage based on a universal serial bus (USB) interface, and the PMIC 24 may generate a voltage and/or a current for charging the battery 28, from the 5V DC voltage, and generate a voltage and/or current for charging the first and second earbuds 11 and 12.

The host device 40 may be any device that provides a source signal to the first and second earbuds 11 and 12 through wireless communication.

Figure 9:
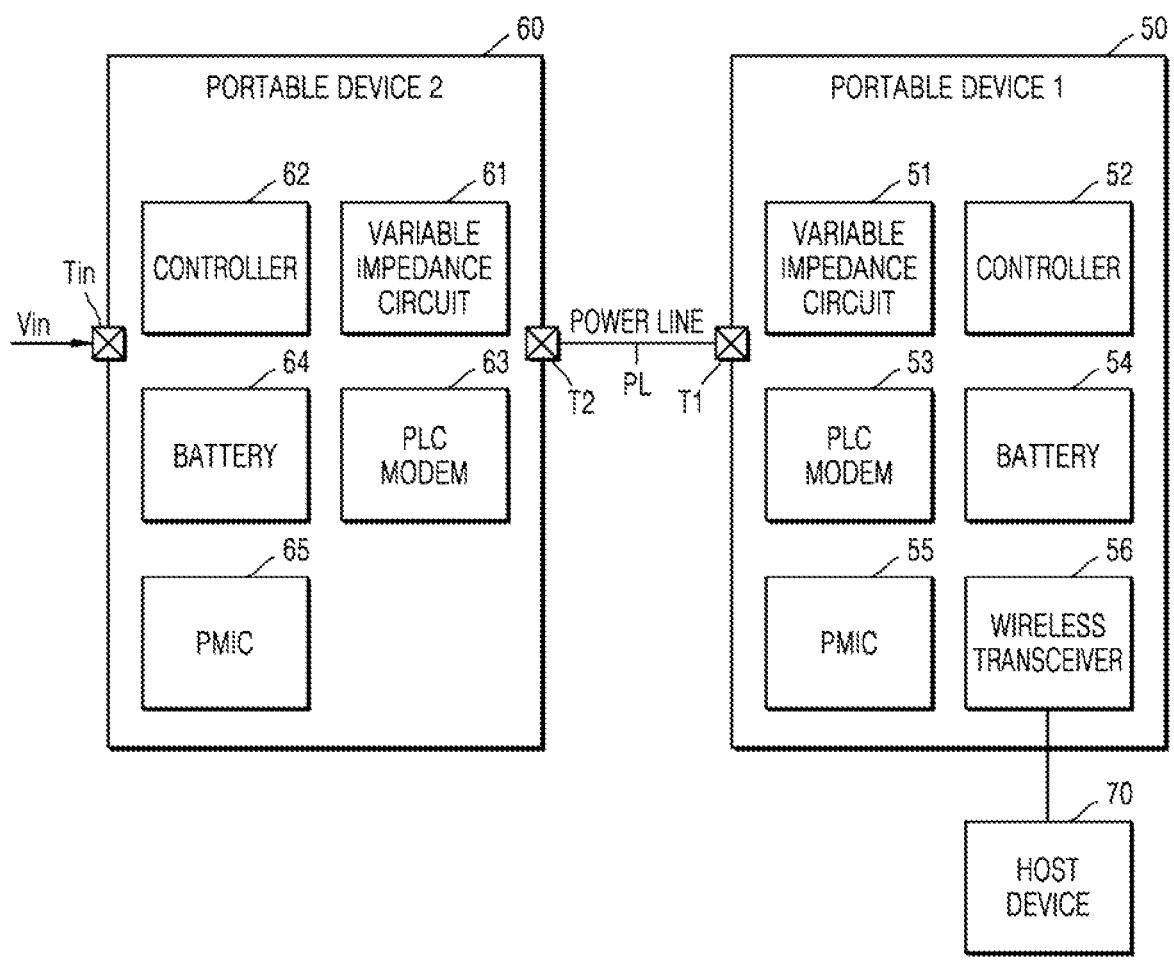
FIG. 9 is a diagram for describing portable devices according to another example embodiment.

FIG. 9 is a diagram for describing portable devices according to another example embodiment. For convenience of description, an example embodiment will now be described by using only one power line PL.

Referring to FIG. 9, a first portable device 50 may correspond to the first portable device 100 illustrated in FIG. 1, the first earbud 11 illustrated in FIG. 8, or the second earbud 12 illustrated in FIG. 8. A second portable device 60 may correspond to the second portable device 200 illustrated in FIG. 1 or the cradle 20 illustrated in FIG. 8.

The first portable device 50 may include a connection pin T1, a variable impedance circuit 51, a controller 52, a PLC modem 53, a battery 54, a PMIC 55, and a wireless transceiver 56. The variable impedance circuit 51, the controller 52, the PLC modem 53, the battery 54, the PMIC 55, and the wireless transceiver 56 may be mounted on a printed circuit board. The PMIC 55 may manage power of the battery 54.

The wireless transceiver 56 may perform wireless communication with a host device 70. For example, the wireless transceiver 56 may include a Bluetooth module and may receive data from the host device 70. The wireless transceiver 56 of the first portable device 50 may provide data received from the host device 70 to the second portable device 60 via power line communication.

The second portable device 60 may include a connection pin T2, an external voltage pin Tin, a variable impedance circuit 61, a controller 62, a PLC modem 63, a battery 64, and a PMIC 65. In another implementation, the second portable device 60 may include the variable impedance circuit 61, the controller 62, the PLC modem 63, the battery 64, and the PMIC 65. The PMIC 65 may manage power of the battery 64.

Figure 10:
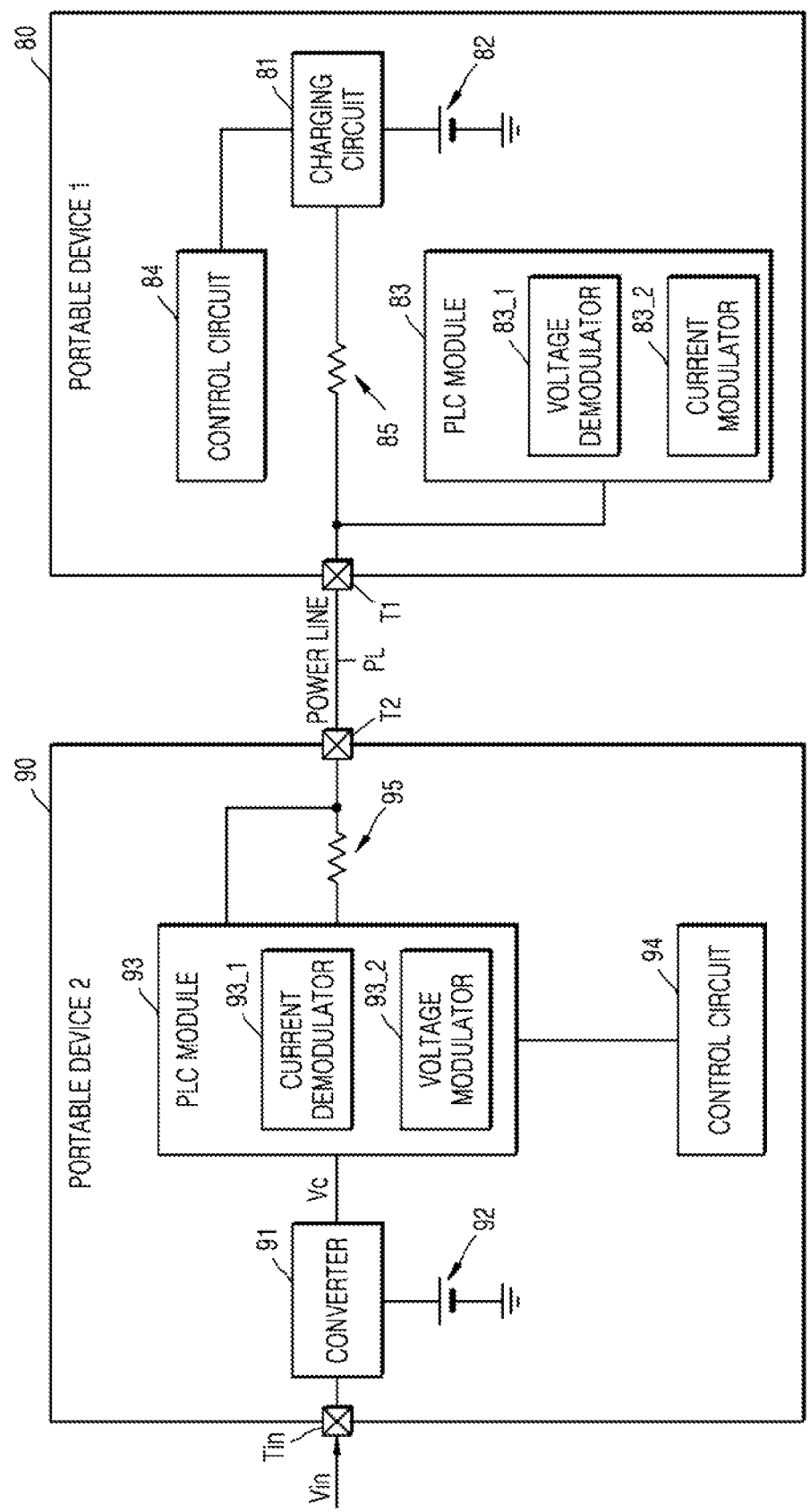
FIG. 10 is a diagram for describing portable devices according to another example embodiment.

FIG. 10 is a diagram for describing portable devices according to another example embodiment.

Referring to FIG. 10, a first portable device 80 may correspond to the first portable device 100 illustrated in FIG. 1, the first earbud 11 illustrated in FIG. 8, the second earbud 12 illustrated in FIG. 8, or the first portable device 50 illustrated in FIG. 9. A second portable device 90 may correspond to the second portable device 200 illustrated in FIG. 1, the cradle 20 illustrated in FIG. 8, or the second portable device 60 illustrated in FIG. 9.

The first portable device 80 may include a connection pin T1, a charging circuit 81, a battery 82, a power line communication module 83, a control circuit 84, and an impedance circuit 85. The charging circuit 81 may be a linear charger, and may be implemented as a charging integrated circuit (IC). The control circuit 84 may enable the charging circuit 81 in a charging period, and may charge the battery 82 based on power received through a power line PL. Also, in a data reception period, the control circuit 84 may disable the charging circuit 81, and the first portable device 80 may operate based on power of the battery 82. The battery 82 may be charged based on power received in a data transmission period.

The second portable device 90 may include a connection pin T2, an external voltage pin Tin, a converter 91, a battery 92, a power line communication module 93, and a control circuit 94. The converter 91 may generate a voltage Vc converted from the external voltage Vin received through the external voltage pin Tin or from a voltage of the battery 92. The converter 91 may include a switching regulator, and may include a boost converter and/or a buck converter and a buck-boost converter as a DC-DC converter. The converter 91 may charge the battery 92 based on the external voltage Vin.

The power line communication module 83 of the first portable device 80 may include a voltage demodulator 83_1 and a current modulator 83_2, and may further include a current source (not shown). The current modulator 83_2 may perform current modulation under the control by the control circuit 84. The current source may generate a modulated current signal (e.g., a current pulse), and the current signal may be output through the connection pin T1. The voltage demodulator 83_1 may demodulate a voltage signal received through the connection pin T1 and provide the demodulated signal to the control circuit 84.

The power line communication module 93 of the second portable device 90 may include a current demodulator 93_1 and a voltage modulator 93_2. The control circuit 94 may control the current demodulator 93_1 and the voltage modulator 93_2. The voltage modulator 93_2 may generate a modulated voltage signal under the control by the control circuit 94, and the voltage signal may be output through the connection pin T2. The voltage modulator 93_2 may include a linear regulator, such as a low drop-out (LDO) regulator. The current demodulator 93_1 may demodulate a current signal received through the connection pin T2 and provide the demodulated signal to the control circuit 94.

Figure 11:
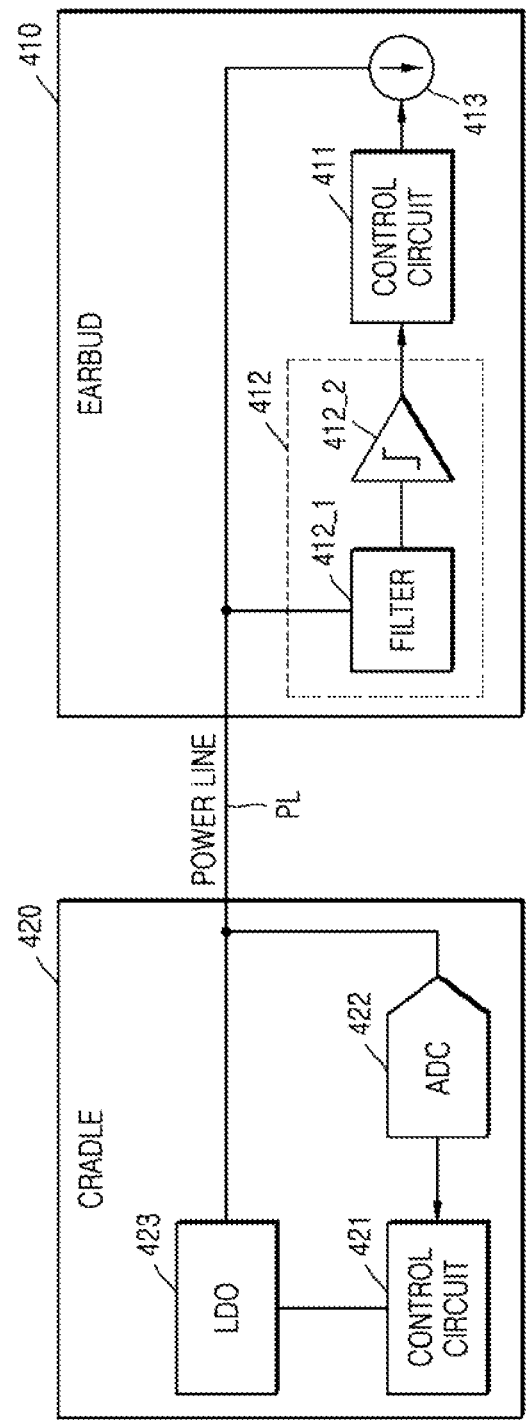
FIG. 11 is a diagram for describing portable devices according to another example embodiment.

FIG. 11 is a diagram for describing portable devices according to another example embodiment.

Referring to FIG. 11, an earbud 410 may correspond to the first portable device 100 illustrated in FIG. 1, and a cradle 420 may correspond to the second portable device 200 illustrated in FIG. 1.

The earbud 410 may include a control circuit 411, a voltage demodulator 412, and a current modulator 413. The voltage demodulator 412 may include a filter 412_1 and an amplifier 412_2.

The cradle 420 may include a control circuit 421, an analog-to-digital converter (ADC) 422, and an LDO regulator 423. The ADC 422 may perform current demodulation. The LDO regulator 423 may perform voltage modulation.

In the earbud 410, the filter 412_1 of the voltage demodulator 412 may remove noise by blocking a specific frequency component of a voltage signal received through the power line PL, and provide the filtered voltage signal to the amplifier 412_2. The amplifier 412_2 may generate a signal having a logic high level or a logic low level by amplifying the voltage signal and provide the same to the control circuit 411. The control circuit 411 may identify the information transmitted by the cradle 420 based on the signal received from the amplifier 412_2, and by controlling the current modulator 413 to transmit the information to the cradle 420, the control circuit 411 may generate a modulated current signal that is transmitted through the power line PL.

In the cradle 420, the ADC 422 may generate a digital signal from a current signal received through the power line PL and provide the same to the control circuit 421. The control circuit 421 may identify information transmitted by the earbud 410 based on the digital signal. By controlling the LDO regulator 423, the control circuit 421 may generate a modulated voltage signal transmitted through the power line PL.

Figure 12:
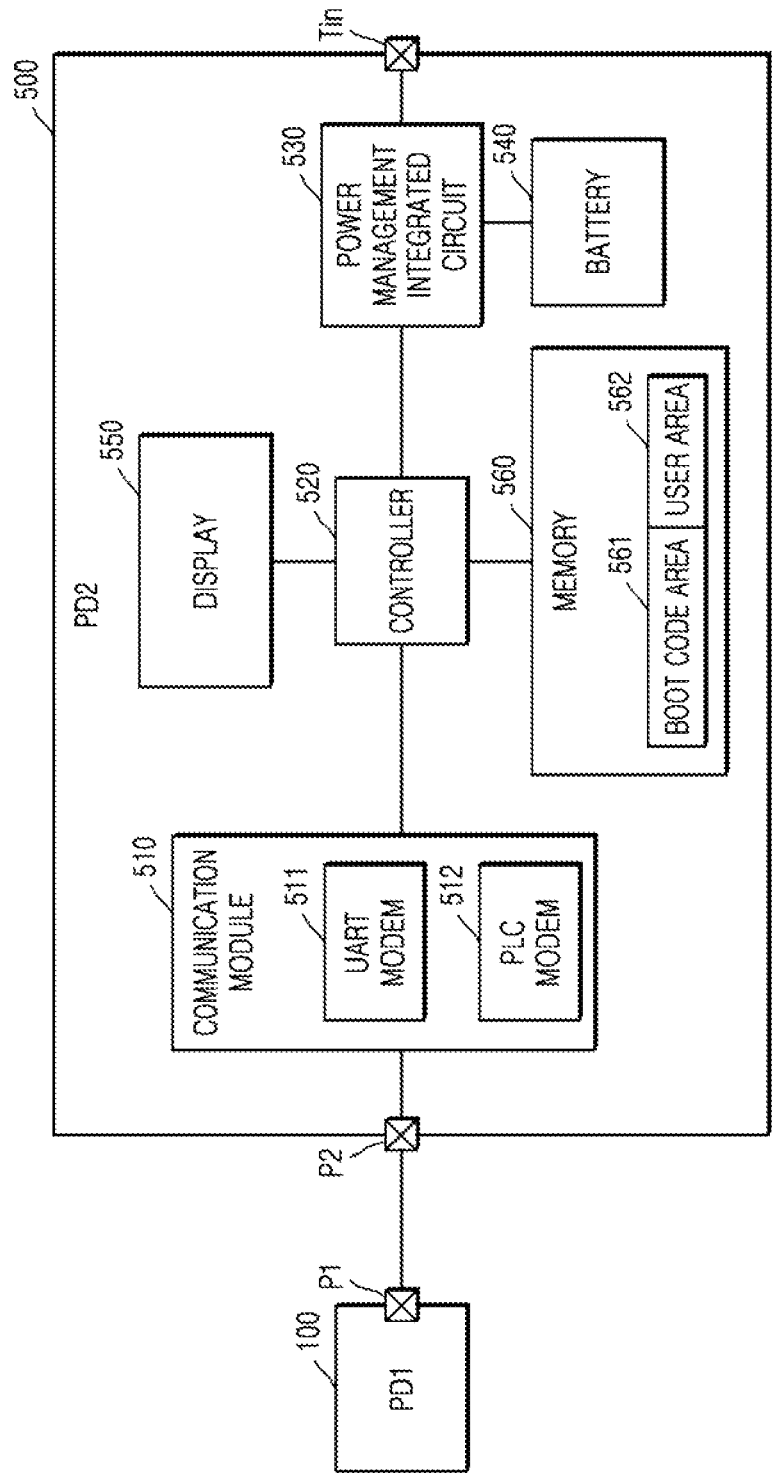
FIG. 12 is a diagram for describing portable devices according to another example embodiment.

FIG. 12 is a diagram for describing portable devices according to another example embodiment.

Referring to FIG. 12, the first portable device 100 is the same as described above.

Each of a first pin P1 of the first portable device 100 and a second pin P2 of a second portable device 500 may be communication pins formed separately from the connection pin T1, a pogo pin, or a power line.

The second portable device 500 may include a communication module 510, a controller 520, a power management integrated circuit 530, a battery 540, a display 550, and a memory 560. The power management integrated circuit 530, the battery 540, and the display 550 are the same as described above with reference to FIG. 2.

The communication module 510 may include a Universal Asynchronous Receiver-Transmitter (UART) modem 511 and a PLC modem 512. The UART modem 511 may perform UART communication with the first portable device 100. The PLC modem 512 is the same as the PLC modem 53 illustrated in FIG. 9.

The controller 520 may perform all of the operations of the controller 220 illustrated in FIG. 2. The controller 520 may control the communication module 510. For example, the controller 520 may control the UART modem 511 to perform UART communication. The controller 520 may load data stored in a boot code area 561 of the memory 560 and perform a firmware update. The firmware update is the same as described above with reference to FIGS. 2, 3, and 4. The controller 520 may load data stored in the user area 562 in a user mode. The controller 520 may control the display 550 to display a charge amount of a battery in the user mode, and control the power management integrated circuit 530 to adjust power supplied from the outside and adjust heat generated in the second portable device 200.

By way of summation and review, it would be advantageous to provide for enhanced data transmission and reception between wireless earphones and a charging case.

Embodiments may provide a portable device via which a firmware update may be conducted easily via power line communication (PLC), and an operating method of the portable device. Embodiments may also provide a portable device via which firmware data may be quickly transmitted, and an operating method of the portable device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A portable device, comprising:
a first pin;
a power line communication module in communication with an external device via the first pin being connected to a second pin of the external device, the external device being configured to store firmware data; and
a controller configured to control the power line communication module,
wherein the power line communication module transmits, to the external device, an update initiation signal to initiate a firmware update,
wherein the update initiation signal causes the external device to:
verify a connection between the first pin of the portable device and the second pin of the external device and send a first response signal to the power line communication module based on a result of the connection verification,
check a battery status,
based on the battery status having a first value, check a battery charge amount,
based on the battery charge amount exceeding a first reference amount, set the battery status to a second value different from the first value,
based on the battery charge amount not exceeding the first reference amount, leave the battery status unchanged,
based on the battery status having the second value, send a second response signal to the power line communication module,
based on the battery charge amount being less than a second reference amount, set the battery status to the first value, and
based on the battery charge amount being not less than a second reference amount, transmit a third response signal to the power line communication module, and
wherein the power line communication module transmits the firmware data to the external device based on the third response signal.

2. The portable device as claimed in claim 1, wherein the power line communication module transmits to the external device, an erase command signal to erase previously stored firmware data stored in the external device before the firmware data is provided to the external device.

3. The portable device as claimed in claim 1, wherein:
the power line communication module splits the firmware data into units of data packets having a first size, for transmission to the external device,
the power line communication module transmits first check data after a predefined number of data packets are transmitted to the external device, and
the first check data from the portable device and a second check data generated by the external device are used in a cyclic redundancy check performed on the data packets at the external device.

4. The portable device as claimed in claim 3, wherein:
the third response signal indicates a pass or a fail with respect to the cyclic redundancy check,
the controller generates an update end signal based on the third response signal indicating the pass, and
the controller, based on the third response signal indicating the fail, controls the power line communication module to transmit the firmware data to the external device again.

5. The portable device as claimed in claim 1, further comprising a wireless communication module coupled to the power line communication module via the controller, wherein the wireless communication module receives the firmware data from a host via wireless communication.

6. The portable device as claimed in claim 5, wherein:
the wireless communication module receives, from the host, a request signal for requesting the firmware update, and
the controller generates the update initiation signal in response to the request signal.

7. The portable device as claimed in claim 5, wherein:
upon the power line communication module receiving the second response signal from the external device,
the controller generates a notification signal for requesting the host to display a message in response to the second response signal, and
the wireless communication module transmits the notification signal to the host via the wireless communication.

8. A portable device, comprising:
a connection pin configured to be connected to an external pin of an external device;
a power line communication module in communication with the external device via the connection pin and the external pin;
a memory module; and
a controller configured to control the power line communication module, wherein:
the power line communication module:
verifies a connection between the connection pin and the external pin and sends a first response signal to the external device based on a result of the connection verification,
checks a battery status,
based on the battery status having a first value, checks a battery charge amount,
based on the battery charge amount exceeding a first reference amount, sets the battery status to a second value different from the first value,
based on the battery charge amount not exceeding the first reference amount, leaves the battery status unchanged,
based on the battery status having the second value, sends a second response signal to the external device,
based on the battery charge amount being less than a second reference amount, sets the battery status to the first value, and
based on the battery charge amount being not less than a second reference amount, transmits a third response signal to the external device;
the power line communication module provides updated firmware data to the portable device.

9. The portable device as claimed in claim 8, wherein
the power line communication module receives first check data from the external device, after a predefined amount of the updated firmware data is received from the external device;
the portable device generates second check data based on the updated firmware data; and
the controller performs a validity check using the first check data and the second check data in a firmware update mode, and controls the memory module to store the updated firmware data in the memory module based on a result of the validity check,
wherein the validity check comprises a cyclic redundancy check.

10. The portable device as claimed in claim 8, wherein:
the controller monitors whether the connection pin is connected to the external pin, and generates a pin response signal notifying that connection between the connection pin and the external device is released, and
the power line communication module transmits the pin response signal to the external device.

11. The portable device as claimed in claim 9, wherein:
the memory module includes a volatile memory configured to temporarily store the updated firmware data, and includes a non-volatile memory configured to store the updated firmware data,
the controller controls the volatile memory to temporarily store the updated firmware data received from the power line communication module, and
the controller controls the non-volatile memory to store the updated firmware data, in response to a result of the validity check, when the result of the validity check is the pass.

12. The portable device as claimed in claim 11, wherein, when the result of the validity check is the fail, the controller controls the volatile memory to release the updated firmware data that is temporarily stored in the volatile memory, and controls the power line communication module to transmit a validity response signal indicating that the result of the validity check is the fail, to the external device.

13. The portable device as claimed in claim 12, wherein the power line communication module receives the updated firmware data again after the validity response signal is transmitted to the external device.

14. The portable device as claimed in claim 11, wherein:
the power line communication module receives, from the external device, an update initiation signal commanding initiation of the firmware update mode before the updated firmware data is received, and provides the update initiation signal to the controller, and
the controller changes from a user mode to the firmware update mode in response to the update initiation signal.

15. The portable device as claimed in claim 14, wherein:
the power line communication module receives an erase command signal to erase firmware data, after the update initiation signal is received, and provides the erase command signal to the controller, and
the controller controls the non-volatile memory to erase the firmware data stored in the non-volatile memory, in response to the erase command signal.

16. The portable device as claimed in claim 8, further comprising:
a power management integrated circuit configured to generate a charging voltage based on an externally supplied voltage, wherein:
the controller compares the battery charge amount with the first reference amount of charge, and
the controller controls the power management integrated circuit to block the externally supplied voltage based on whether the battery charge amount is greater than the first reference amount of charge.

17. An operating method of a portable device for performing power line communication with an external device via a connection pin, the operating method comprising:
providing an update initiation signal commanding the external device to initiate a firmware update;
wherein the update initiation signal command causes the external device to:
verify a connection between the connection pin of the portable device and a pin of the external device and send a first response signal to the portable device based on a result of the connection verification, check, a battery status,
based on the battery status having a first value, check a battery charge amount,
based on the battery charge amount exceeding a first reference amount, set the battery status to a second value different from the first value,
based on the battery charge amount not exceeding the first reference amount, leaving the battery status unchanged,
based on the battery status having the second value send a second response signal to the portable device based on the battery status,
based on the battery charge amount being less than a second reference amount sett the battery status to the first value, and
based on the battery charge amount being not less than a second reference value, transmit a third response signal to the portable device; and
providing firmware data, which has been previously stored in the portable device, to the external device.

18. The operating method as claimed in claim 17, wherein the providing of the firmware data to the external device includes:
providing first check data to the external device, after a predetermined amount of the firmware data is provided to the external device,
generating second check data based on the firmware data provided to the external device,
performing a validity check on the firmware data provided to the external device, using the first check data and the second check data, and
splitting the firmware data into units of data packets having a first size, for transmission to the external device,
wherein the first check data is provided to the external device after a plurality of data packets having a second size greater than the first size are transmitted to the external device, and wherein the validity check comprises a cyclic redundancy check performed on the plurality of data packets.

19. The operating method as claimed in claim 18, wherein the providing of the firmware data to the external device includes, in response to the response signal indicating a fail with respect to the cyclic redundancy check, transmitting the firmware data to the external device again.

20. The operating method as claimed in claim 19, further comprising:
providing an update end signal commanding the firmware update to the external device to end, in response to the first and second response signals transmitted by the external device and in response to the third response signal indicating a pass with respect to the cyclic redundancy check.

* * * * *